W. GRUS, Jr.
SPRING LEAF LUBRICATOR.
APPLICATION FILED MAY 29, 1915.
1,188,442.
Patented June 27, 1916.
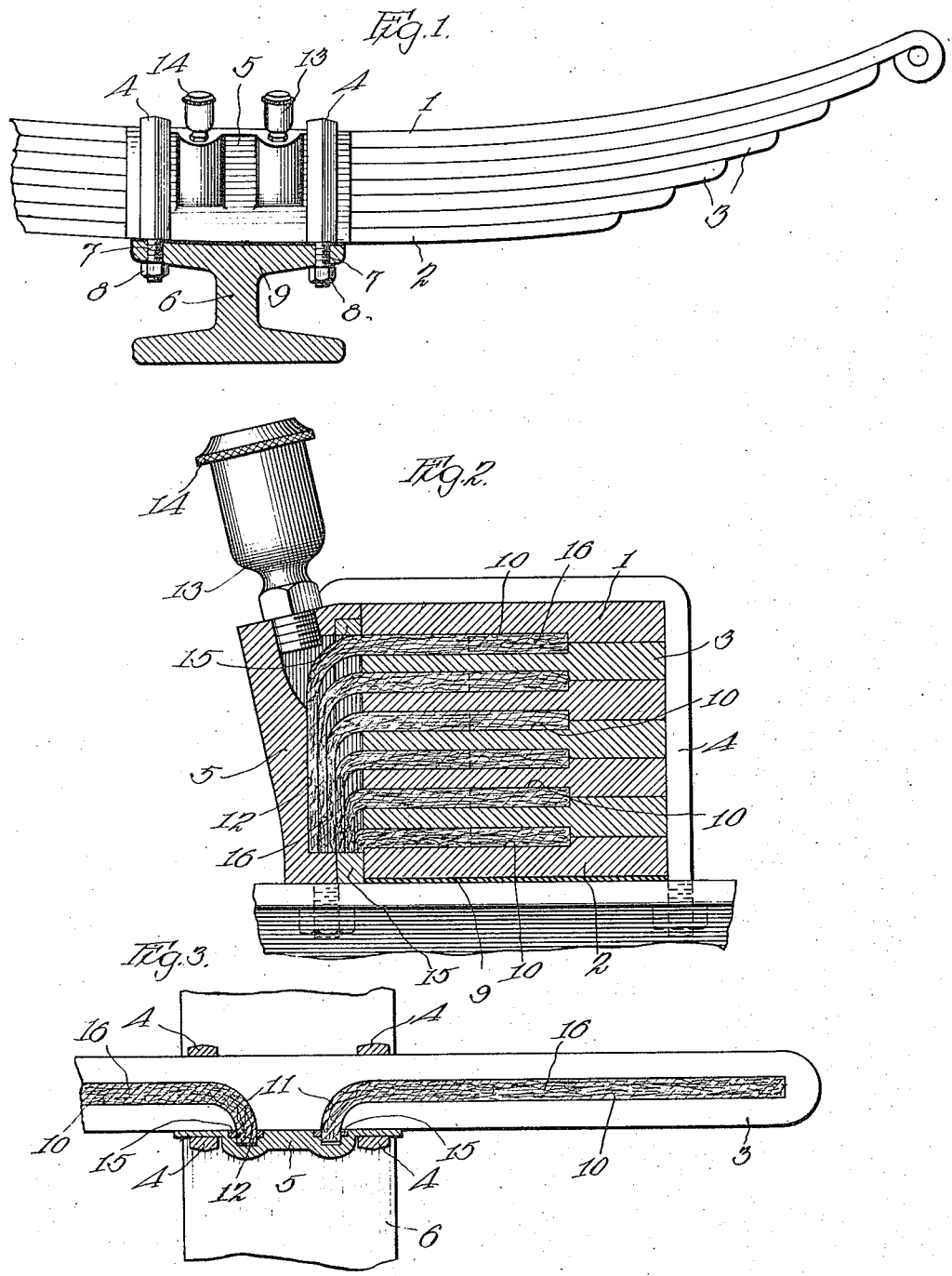
Witness:
Leo J. Dumais.
Inventor:
William Grus Jr.
By Brown, Nissen & Sprinkle
Attys.

UNITED STATES PATENT OFFICE.

WILLIAM GRUS, JR., OF CHICAGO, ILLINOIS.

SPRING-LEAF LUBRICATOR.

1,188,442.  Specification of Letters Patent.  Patented June 27, 1916.

Application filed May 29, 1915. Serial No. 31,103.

*To all whom it may concern:*

Be it known that I, WILLIAM GRUS, Jr., a citizen of the United States, residing at Chicago, in the county of Cook and State of Illinois, have invented certain new and useful Improvements in Spring-Leaf Lubricators, of which the following is a specification.

This invention relates to a lubricator which has for its principal object to provide an improved construction, combination and arrangement of parts for lubricating the leaves of a spring by introducing a lubricant between the leaves.

Other objects will appear hereinafter.

In the accompanying drawings—Figure 1 is a side elevation of a leaf spring to which a lubricator embodying the principles of my invention is attached; Fig. 2 is a cross-sectional view of the same; and Fig. 3 is a view partly in section showing a plan view on one of the leaves.

A lubricant may be introduced between the leaves of a spring which consists of a plurality of leaves, by forming the leaves with grooves into which the lubricant may flow, and by connecting the grooves with a reservoir or receptacle which holds a body or quantity of the lubricant. Such a construction may be further improved by inserting in each of the grooves between the leaves, a wick or some similar material of an absorbent nature, one end of which has communication with the reservoir containing the lubricant, so that the lubricant may be introduced between the leaves by capillary attraction.

In the present invention, a leaf spring, comprising outside leaves 1 and 2, and intermediate leaves 3, is provided, as shown in Fig. 1, with spring fastening clips 4 for securing the leaves together, and for holding a lubricator plate 5 in position at the side of the leaves. Such a spring is usually secured to a suitable support 6 by providing the clips 4 with threaded extremities 7 which extend through perforations in the support and are held in place by fastening devices 8. A thin pad 9 of leather or the like, is usually interposed between the lowermost leaf and the support 6.

Each outside leaf 1 and 2 is formed with a groove 10 on its inside face, and each of the intermediate leaves 3 is formed on both sides with a similar groove 10. The grooves of adjacent leaves register with each other, so that they form a duct substantially twice the depth of the groove in each side of one of the leaves. At the center or adjacent the support of the spring each groove 10 is formed with a bend 11 (see Fig. 3), which extends to the edge of the leaf. The bent portions of the grooves open on a line at the edges of the leaves so that they substantially register.

In the lubricator plate 5 are recesses 12 which register with the openings at the edges of the leaves, and communicating with the top of the recess is an oil cup 13 with a removable top 14, through which a lubricant may be introduced into the recess 12 in order to make a substantially fluid-tight connection to prevent the escape of the lubricant from each recess 12; a perforated packing 15 is placed around the edge of each recess which is pressed in contact with the edges of the leaves when the plate 5 is applied to the spring, so that a fluid-tight connection is made between the plate and the spring.

A wick 16 of absorbent material is placed in the duct formed by the grooves of adjacent leaves, and extends from the outer end of the spring into the recess 12 of the plate 5 and preferably to the bottom of the recess, so that any lubricant contained in the recess may be conducted by capillary attraction between the leaves to lubricate them.

In operation, it is necessary only to feed the lubricant to the recesses 12 by means of the oil cup, whereupon the lubricant will be properly conducted by means of capillary attraction in the wicks to lubricate the spring. The packing 15 prevents the lubricant from exuding from the sides of the plate and confines it to the space of the recess 12. It is obvious that the wicks may be omitted and the lubricant forced or conducted between the leaves of the spring simply by means of the ducts formed by the grooves in the leaves. Furthermore, although the grooves in the leaves as shown in the present invention, are rectangular in shape, it is obvious that they might be semi-circular or some other shape and perform the same function. Although I have shown the lubricating plate secured by the spring fastening clips 4, it is also obvious that the ducts might lead simply to the edge of the spring and there have communication with the recess of a plate similar to the plate 5 but secured only to the edge of the spring, as shown, for example, in my Patent No. 1,121,354 issued Dec. 15, 1914.

What I claim is:

1. The combination with a spring comprising a plurality of superimposed leaves, of means for confining a body of lubricant against a portion of the edges of the leaves, and fibrous material between the leaves communicating with the body of the lubricant for introducing the lubricant between the leaves by capillary attraction.

2. The combination with a spring comprising a plurality of superimposed leaves with grooves forming channels between them, of means for confining a body of lubricant against a portion of the edges of the leaves, and a wick in each of the channels having communication with the body of the lubricant.

3. The combination with a spring comprising a plurality of superimposed leaves, of a casing engaging the spring adapted to contain a lubricant and confine the same against a portion of the edges of the leaves, and wicks disposed between the leaves each having one end which extends into the casing for conducting the lubricant between the leaves by capillary attraction.

4. The combination with a spring comprising a plurality of superimposed leaves, of means for confining a body of lubricant against a portion of the edges of the leaves, ducts leading from the edges of the leaves toward the ends thereof, and a wick disposed in each of the ducts having one extremity in communication with the body of the lubricant.

5. The combination with a spring comprising a plurality of superimposed leaves with corresponding grooves forming ducts from the sides thereof, of means for confining a body of lubricant against a portion of the edges of the leaves in communication with the grooves, and a wick in each of the grooves to conduct a lubricant therein by capillary attraction.

6. The combination with a spring having a plurality of leaves, of a perforated plate, a piece of flexible material formed with perforations registering with the perforation of the plate, the perforations of the flexible material being disposed over the edges of a number of leaves to confine a body of lubricant therein, a lubricating cup connected to the perforation of the plate, and a wick extending from the interior of the perforation of the flexible material between each pair of adjacent leaves.

7. The combination with a spring having a plurality of leaves, of a perforated plate, a piece of flexible material formed with perforations registering with the perforation of the plate, the perforations of the flexible material being disposed over the edges of a number of leaves to confine a body of lubricant therein, a lubricating cup connected to the perforation of the plate, a wick extending from the interior of the perforation of the flexible material between each pair of adjacent leaves, and means for securing the plate to the spring.

8. The combination with a spring comprising a plurality of superimposed leaves having grooves which have ducts therein from one edge of the leaves toward the end thereof, of a casing engaging the spring, a perforated piece of pliant material, the perforation of which is adapted to contain a lubricant and confine the same against the edges of the spring, and a wick disposed in each duct and having an extremity which extends within the perforation of the pliant material to conduct lubricant therefrom by capillary attraction throughout the length of the leaves.

9. The combination with a spring comprising a plurality of superimposed leaves, of means for confining a body of lubricant against a portion of the edges of the leaves, and ducts leading from the edges of the leaves toward the ends thereof.

10. The combination with a spring comprising a plurality of superimposed leaves, of a casing engaging the spring adapted to contain a lubricant and confine the same against a portion of the edges of the leaves of the spring, and corresponding grooves in the superimposed leaves forming ducts from the edges thereof against which the lubricant is confined.

In testimony whereof I have signed my name to this specification, in the presence of two subscribing witnesses, on this 27th day of May A. D. 1915.

WILLIAM GRUS, Jr.

Witnesses:
Thomas Colson,
Charles H. Seem.